(12) United States Patent
Iken et al.

(10) Patent No.: US 12,292,291 B2
(45) Date of Patent: May 6, 2025

(54) METHOD AND DEVICE FOR DETERMINING THE POSITION OF A VEHICLE

(71) Applicant: Volkswagen Aktiengesellschaft, Wolfsburg (DE)

(72) Inventors: Timo Iken, Wolfsburg (DE); Roland Kube, Schwülper (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 274 days.

(21) Appl. No.: 17/796,988

(22) PCT Filed: Jan. 25, 2021

(86) PCT No.: PCT/EP2021/051647
§ 371 (c)(1),
(2) Date: Aug. 2, 2022

(87) PCT Pub. No.: WO2021/156091
PCT Pub. Date: Aug. 12, 2021

(65) Prior Publication Data
US 2023/0053629 A1    Feb. 23, 2023

(30) Foreign Application Priority Data

Feb. 4, 2020  (DE) .................. 10 2020 201 351.9

(51) Int. Cl.
*G01C 21/30*    (2006.01)
*G01C 21/00*    (2006.01)
*G01C 21/16*    (2006.01)

(52) U.S. Cl.
CPC ......... *G01C 21/30* (2013.01); *G01C 21/1656* (2020.08); *G01C 21/3885* (2020.08)

(58) Field of Classification Search
CPC . G01C 21/30; G01C 21/1656; G01C 21/3885
See application file for complete search history.

(56) References Cited

U.S. PATENT DOCUMENTS

| | | | |
|---|---|---|---|
| 6,230,100 B1 | 5/2001 | Geier | 701/466 |
| 10,676,131 B2 | 6/2020 | Ayyappan | |
| 2018/0073891 A1* | 3/2018 | Max | B62D 15/021 |

FOREIGN PATENT DOCUMENTS

| | | | |
|---|---|---|---|
| CN | 105424050 A | 3/2016 | G01C 21/30 |
| CN | 108827292 A | 11/2018 | G01C 21/16 |

(Continued)

OTHER PUBLICATIONS

Machine English Translation of DE102018221864A1 (Year: 2018).*

(Continued)

*Primary Examiner* — Andrew J Cromer
(74) *Attorney, Agent, or Firm* — Slayden Grubert Beard PLLC

(57) ABSTRACT

Disclosed is a method for determining the position of a vehicle, in which highly accurate localization data for positions of the vehicle are determined when traveling along a route. Odometric measured variables for the own odometry of the vehicle are captured when traveling along the route. The highly accurate localization data determined and the odometric measured variables captured are jointly evaluated. The own odometry of the vehicle is corrected on the basis of the evaluation. An error model is used to calculate a vehicle-specific drift for the own odometry of the vehicle and to continually correct the own odometry of the vehicle provided highly accurate localization data can be determined. The corrected own odometry of the vehicle can then be used in areas in which highly accurate localization data cannot be determined in order to determine the position of the vehicle.

10 Claims, 2 Drawing Sheets

(56) References Cited

FOREIGN PATENT DOCUMENTS

| | | | | |
|---|---|---|---|---|
| DE | 19735659 | C1 | 10/1999 | ............ G01C 21/20 |
| DE | 102012024632 | A1 | 6/2014 | ......... B60W 40/105 |
| DE | 102016001269 | A1 * | 8/2016 | |
| DE | 102015112313 | A1 | 2/2017 | ........... B60W 30/06 |
| DE | 102016005470 | A1 | 2/2017 | ........... B60W 40/12 |
| DE | 102017121017 | A1 | 3/2019 | ............ G01C 21/26 |
| DE | 102017216238 | A1 | 3/2019 | ............ G01C 21/26 |
| DE | 102019124564 | A1 | 10/2019 | ......... B60W 40/105 |
| DE | 102018221864 | A1 * | 6/2020 | ....... B60W 50/0225 |
| DE | 102019124561 | A1 | 3/2021 | ............ F16H 63/38 |
| DE | 102020201351 | A1 | 8/2021 | ........... B60W 40/10 |
| EP | 3578919 | A1 | 12/2019 | ............ G01C 21/28 |
| WO | 2017/178232 | A1 | 10/2017 | ............ B60W 50/02 |
| WO | 102017105879 | A1 | 9/2018 | .............. G08G 1/16 |
| WO | 2021/156091 | A1 | 8/2021 | ............ G01C 21/00 |

OTHER PUBLICATIONS

English Machine Translation of DE-102016001269-A1 (Year: 2016).*
Sautter, Leonie, "Graphbasiertes SLAM mit integrierter Kalibrierung für mobile Roboter," Thesis, Institute for Anthropomatics and Robotics, URL: https://publikationen.bibliothek.kit.edu/1000051071/3768563, 126 pages (German w/ English abstract), Jun. 10, 2015.
German Office Action, Application No. 102020201351.9, 7 pages, Nov. 10, 2020.
International Search Report and Written Opinion, Application No. PCT/EP2021/051647, 16 pages, Apr. 6, 2021.
German Office Action, Application No. 102020201351.9, 9 pages, Mar. 6, 2024.
Chinese Office Action, Application No. 202180011437.3, 11 pages, Sep. 14, 2024.

* cited by examiner

METHOD AND DEVICE FOR DETERMINING THE POSITION OF A VEHICLE

TECHNICAL FIELD

The present invention relates to a method for determining the position of a vehicle and a device for carrying out a method.

CROSS-REFERENCE TO RELATED APPLICATIONS

This application claims priority to German Patent Application No. 10 2020 201 351.9, filed on Feb. 4, 2020 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Nowadays, determining position for navigation purposes in motor vehicles by means of satellite-based navigation systems, such as the Global Positioning System (GPS) or the European Galileo system, the latter albeit still being at the trial stage, is widely used. However, current satellite location systems have various disadvantages. For example, the transmission of GPS signals may sometimes be prevented by the satellite operator or the vehicle may temporarily be unable to receive GPS signals, for example because it is in a car park or a tunnel. Similarly, current satellite location systems are accurate to within a few meters and, although this is sufficient for simple navigation purposes, it is not for future applications such as self-driving for which the most accurate possible determining of position to within a few decimeters or centimeters is required.

Furthermore, to determine a vehicle's relative position, the area surrounding the vehicle can be captured using that vehicle's sensors. This can take place, for example, with the aid of using one or more camera/s of the vehicle, but also with other sensors such as, for example, radar, ultrasound or lidar sensors. As a result, for example, distances from lane markings, curbs, guardrails or reflector posts, but also from other stationary objects in the area surrounding the vehicle, such as traffic signs, traffic lights or edges of buildings, can be determined accurately.

By combining the sensorially measured distances with a high-resolution digital map, what is referred to as an HD map, highly accurate localization can then also take place. However, this approach is very costly in terms of the components provided in the respective vehicle for capturing and evaluating the sensor data. The creation and constant updating of the most comprehensive possible HD map is also very expensive. The high resolution of an HD map covering a relatively large geographical area similarly results in a large quantity of data for the HD map and therefore the need for a large memory in the vehicle and a large transmission bandwidth when transmitting the map data to the vehicle, for example via a mobile radio link.

Another method of estimating the relative position and orientation of a vehicle is based on what is referred to as odometry. Measured variables from the chassis, the yaw rate sensor and the steering are usually used as input variables here. For example, in wheel-driven vehicles, the number of wheel rotations between two measurement times is determined and, together with the known wheel circumference or wheel diameter, a distance is calculated therefrom: The direction of movement of the vehicle can be determined from the wheel steering angle or the steering wheel angle.

The accuracy of odometric methods of measurement is influenced and distorted by varying vehicle parameters and environmental factors, but may be sufficient if only short distances have been covered such as, for example, in a parking maneuver. However, since the incremental movements particular to the vehicle along a route are repeatedly estimated and the respective estimated values are added up, the errors are added together so that, over longer distances, appreciable deviations from the actual position may occur, making highly accurate localization impossible. Odometry is hence not usually the only method used for determining the position. Instead, it is used in navigation systems in addition to GPS location in order to bridge areas where there is no reception, such as in tunnels, and to refine the GPS results.

As in odometry, an inertial measurement unit (IMU) with numerous acceleration and rotation rate sensors can also be used to determine constantly the spatial movement of a vehicle, a drift of the sensors used also being unavoidable here.

SUMMARY

A need exists to provide an improved method for determining the position of a vehicle and a corresponding device. The need is addressed by a method and by a device according to the independent claims. Embodiments of the invention are described in the dependent claims, the following description, and the drawings.

DESCRIPTION

Figure 1:
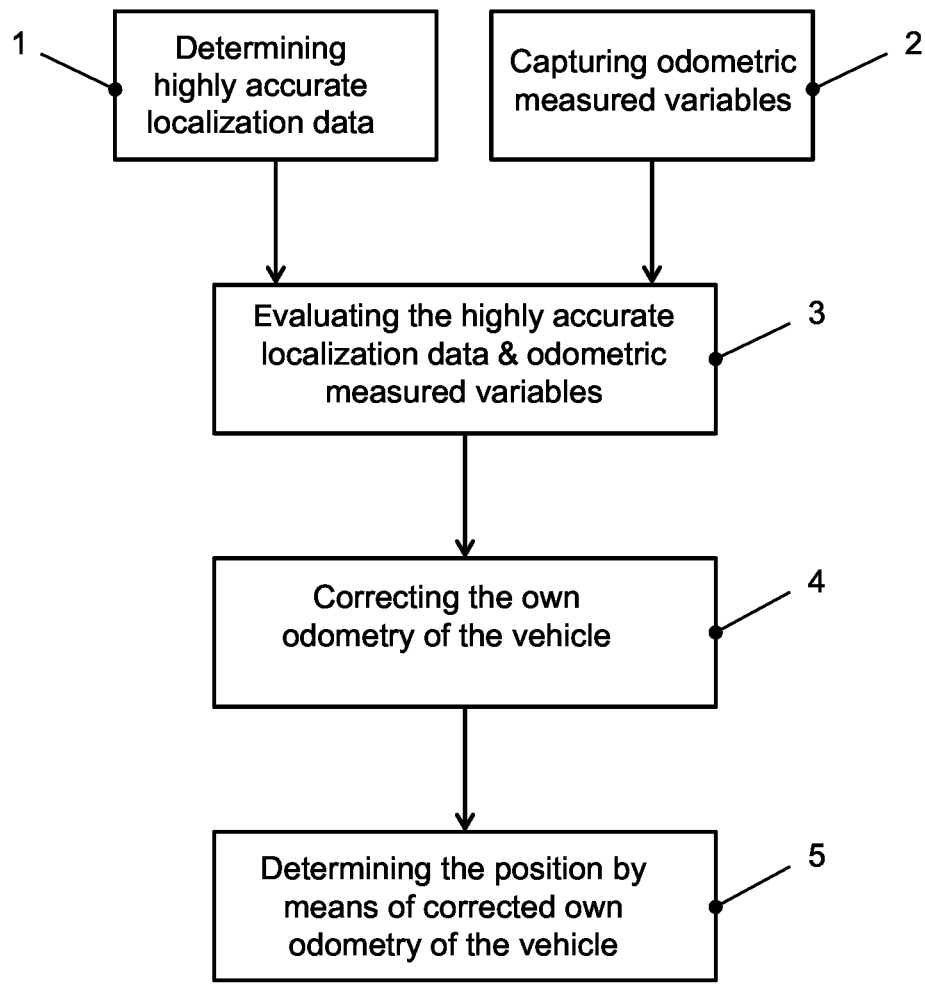
FIG. 1 shows a flow diagram of a method according to embodiments.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a method according to some embodiments for determining the position of a vehicle,
    highly accurate localization data for positions of the vehicle are determined when traveling along a route;
    odometric measured variables for the own odometry of the vehicle are captured when traveling along the route;

the highly accurate localization data are determined and the odometric measured variables captured are jointly evaluated; and the own odometry of the vehicle is corrected on the basis of the evaluation.

In this way, the own odometry of the vehicle, which is vehicle-specific, for example, owing to the respective tire sizes, the diameters differing as a function of the tire pressure and amount of wear, or the wheel circumferences, can be corrected automatically and individually for the respective vehicle. The accuracy of the determination of position on the basis of the own odometry and therefore the availability of highly accurate localization can therefore be considerably increased. This requires no additional vehicle components giving rise to any costs.

In some embodiments, an error model for the own odometry of the vehicle is used here to calculate a vehicle-specific drift and to automatically correct the own odometry of the vehicle through compensation of the calculated drift.

It is a benefit if the own odometry of the vehicle is continuously corrected as long as highly accurate localization data can be determined.

In particular, the corrected own odometry of the vehicle is used here in areas in which highly accurate localization data cannot be determined in order to determine the position of the vehicle.

The highly accurate localization data are for example determined by means of a digital area map and a sensory detection of landmarks marked on the digital area map.

Furthermore, influences on the vehicle from outside that vehicle are also determined when traveling along the route and are taken into account in the error model in order to determine a vehicle-specific drift independent of the influences from outside the vehicle.

The influences from outside the vehicle when traveling along the route may comprise existing weather and/or road conditions here.

Similarly, the odometric measured variables of the vehicle may comprise, in particular, the wheel rotation, the yaw rate and/or the wheel steering angle.

Furthermore, the speed and/or driving power of the vehicle may also beneficially be captured and taken into account in the error model.

A device according to some embodiments for determining the position of a vehicle comprises a unit for capturing odometric measured variables for the own odometry of the vehicle when traveling along the route;

an evaluation and control unit for determining highly accurate localization data for positions of the vehicle when traveling along a route, for jointly evaluating the highly accurate localization data determined and the odometric measured variables captured and for correcting the own odometry of the vehicle on the basis of the evaluation.

Further features of the present invention will become apparent from the following description and the claims in conjunction with the FIGS.

In order to better understand the principles of the present invention, further embodiments are explained in greater detail in the following based on the FIGS. It should be understood that the invention is not limited to these embodiments and that the features described may also be combined or modified without departing from the scope of protection of the invention as defined in the claims.

Specific references to components, process steps, and other elements are not intended to be limiting. Further, it is understood that like parts bear the same or similar reference numerals when referring to alternate FIGS.

FIG. 1 shows a flow diagram of an embodiment of a method. In a first method step 1, highly accurate localization data are determined by a vehicle when traveling along a route. For this purpose, the area surrounding the vehicle is captured using sensors of the respective vehicle. This can take place, for example, with the aid of using one or more camera/s of the vehicle, but also with other sensors such as, for example, radar, ultrasound or lidar sensors. If a landmark is captured in the area surrounding the vehicle using the sensors, the sensor signals are evaluated in order to determine the distance between the vehicle and the landmark and to determine what the landmark is. If the landmark is recognized, the highly accurate position is then taken from a digital area map. For this purpose, a satellite-based navigation system may first be used to approximately determine the GPS position of the vehicle in order to determine from digital map information a matching portion in the form of the digital area map. However, this can also be dispensed with if the landmark can clearly be identified.

The digital map data may already be present in the navigation device of the vehicle here, or else may be provided by an external central processing unit in the form of a central backend server, transmission then taking place via a wireless data radio link between the respective vehicle and the backend server, for example by means of a mobile radio unit provided in the respective vehicle.

Furthermore, in a method step 2, odometric measured variables for the own odometry of the vehicle are captured when traveling along the route. Method step 1 and method step 2 are typically carried out simultaneously here.

In particular, measured variables from the chassis, such as the wheel rotations, from the yaw rate sensor and the steering are captured here. As already mentioned, the precision may be influenced here by varying vehicle parameters and environmental factors. For example, the following parameters influence the precision of an odometric position measurement:

A lack of roundness and wear in the geometry of a wheel may lead to incorrect wheel diameter values. Similarly, the profile and material of the tire, the changing of the diameter and of the softness of the tire for different tire pressures or the tire temperature may lead to different values. Furthermore, different surface conditions of the road being traveled along, such as the respective material and the respective unevenness of the road surface, may lead to different values. For example, the accuracy of any measurement may be impaired by a different tire slip, the tire slip, in addition, also depending on the current speed and acceleration values of the vehicle. Depending on the weight of the vehicle or the vehicle load, the wheels may also be subject to different levels of strain and deformation and individual wheels may be subject to greater strain and deformation if the load is uneven.

Similarly, however, factors outside the vehicle in the form of varying weather or atmospheric conditions such as, in particular, different wind strengths and directions or a different adhesion of the wheels depending on whether the vehicle is traveling along a dry road or a road that is wet with rain or slippery with snow, may also influence the accuracy.

The highly accurate localization data determined and the odometric measured variables captured are jointly evaluated during the journey in a method step 3. The evaluation may, in particular, take place here using a suitable online algorithm in the vehicle, but also through a backend server.

In a method step 4, a correction of the own odometry of the vehicle then takes place on the basis of the evaluation. For this purpose, a vehicle-specific drift is calculated using an error model based on the highly accurate localization data determined, the odometric measured variables captured for the own odometry of the vehicle, further vehicle parameters such as the current vehicle speed and/or acceleration, and current direction of travel (left/right bend or traveling in a straight line) and, if applicable, the current influences from outside the vehicle.

The own odometry of the vehicle is then automatically corrected through compensation of the calculated vehicle-specific drift by means of one or more correction values. Since such correction is being carried out continually, provided highly accurate localization data can be determined, an own odometry of the vehicle is constantly much more accurate than uncorrected odometry even if the parameters relevant to the odometry change.

The correction values are for example also saved here. In particular, different correction values for different weather and atmospheric conditions can also be saved here so that, depending on future conditions, a suitable correction may be carried out in the correction model here.

Should it then not be possible to determine any highly accurate localization data within a short period of time, the corrected own odometry of the vehicle can then be used in a method step 5 for determining the position of the vehicle.

Instead of using the corrected own odometry of the vehicle for improved determining of the position of an individual vehicle, it is possible, when a plurality of vehicles are traveling along the route, what is referred to as a swarm of vehicles, each of which having a more accurate own odometry of the vehicle through correction, for a highly accurate swarm map to be constructed and made available by a central backend server. This may then, for example, form the basis of trajectory planning of other vehicles or more accurate details on the positions of landmarks in that area.

Figure 2:
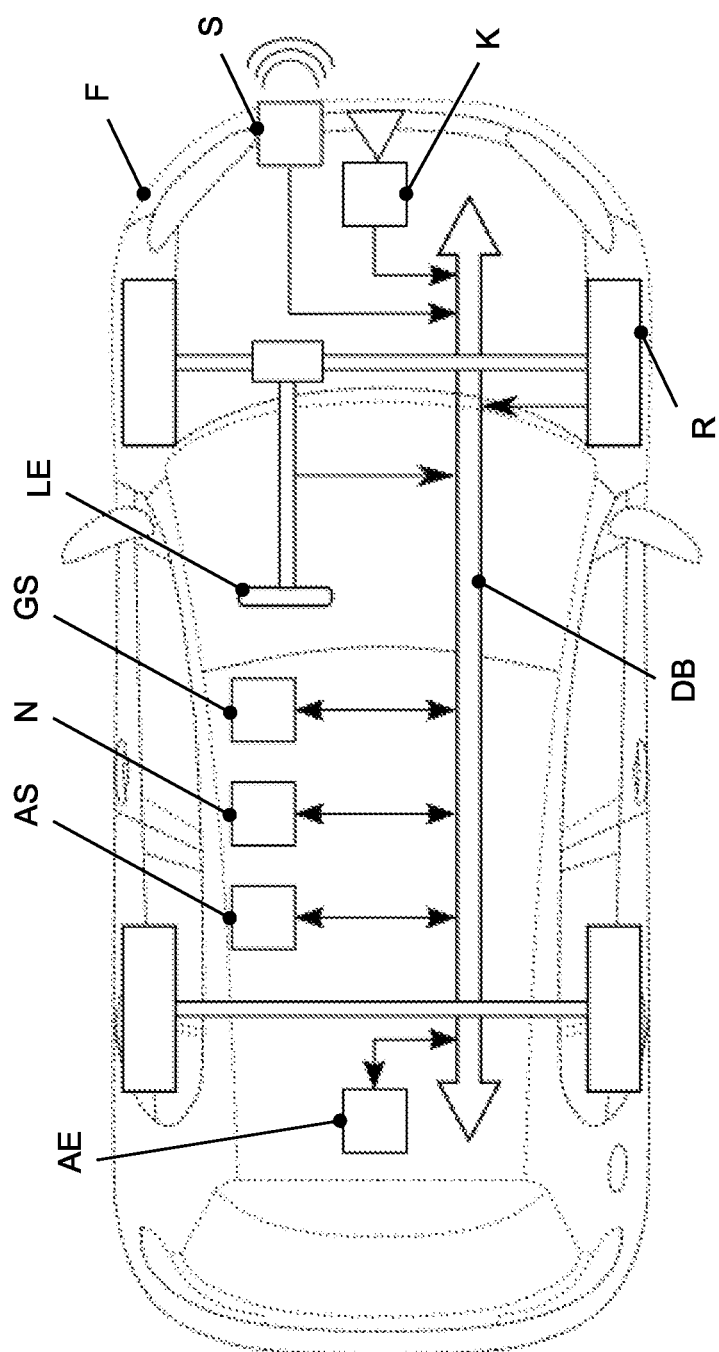
FIG. 2 shows schematically a vehicle with a device according to embodiments.

FIG. 2 schematically shows a plan view of a vehicle F in which automatic odometry correction can be carried out. The vehicle F may, in particular, be a car or truck.

The vehicle has various units for determining position. For example, it is provided in particular an evaluation and control unit AS for carrying out the method according to the teachings herein, which can be configured, for example, as a control device of the vehicle F and have one or more microcontrollers or microprocessors.

An approximate localization of the vehicle can first take place with a navigation unit N based on received GPS signals. In conjunction with highly accurate map data and a sensor-based capturing of landmarks in the area surrounding the vehicle, the vehicle can then be localized very precisely. For this purpose, the vehicle may have a vehicle camera K which captures the area in front of and, if applicable, also alongside the vehicle. The image and video data generated by the vehicle camera can be fed, via a digital databus DB in the vehicle, to the evaluation and control unit AS which evaluates the image data in order to identify the landmarks in the area surrounding the vehicle using suitable image processing methods. The vehicle also has at least one further sensor S with which the area surrounding the vehicle can be captured and the distance between the vehicle and objects in the area surrounding the vehicle can be determined. The sensor data are likewise fed to the evaluation and control unit AS.

As an odometric measured variable for the own odometry of the vehicle F, in particular, a signal may be determined via the rotational movement of the vehicle wheels R which gives the rotational direction and the rotational angle or the number of rotations and can be determined, for example, by means of rotation speed sensors located on the wheels. In addition, the current steering angle of a steering unit LE of the vehicle F can be captured. The steering unit LE may, for example, be a steering system with a steering gear, for example a toothed rack steering gear, or electro-hydraulic power steering. Furthermore, by means of a yaw rate sensor GS, it is possible to determine whether the vehicle is rotating about its own vertical axis or the steering direction taken by the vehicle driver and the actual driving direction differ from one another and, if applicable, when negotiating a curve, individual wheels are deliberately being braked in order to prevent over- or understeer.

On the basis of these parameters and on the basis of further data such as the geometry of the wheels and the steering ratio of the steering apparatus, the evaluation and control unit AS can determine how far and in what direction the vehicle has moved corresponding to the odometric determining of position in relation to a previous vehicle position. By continually comparing the odometrically determined position of the vehicle with the vehicle position determined from the highly accurate map data, correction values can then be determined for the odometry by the evaluation and control unit AS and applied for correction.

The evaluation and control unit AS can also be fed data on the current speed and acceleration of the vehicle by a control device of the vehicle here. Furthermore, account may also be taken of data on current weather and atmospheric conditions which can be captured by suitable sensor technology in the vehicle or else fed to the vehicle from outside. For example, the current outside temperature can be determined using an outside temperature sensor of the vehicle, whilst data on the current wind conditions are received via a mobile data radio link.

Furthermore, an assistance unit AE is provided in the vehicle which, based on the position data obtained, provides assistance functions such as automatic longitudinal and lateral control of the vehicle and, for this purpose, if highly accurate localization data are lacking, uses the corrected own odometry of the vehicle.

The vehicle may also have further components that are not shown. For example, a memory may be provided for storing the correction values for the own odometry of the vehicle or the highly accurate map data. Similarly, the vehicle may have a mobile radio transmission unit with which data can be exchanged with the backend server or other vehicles.

The invention may be used in any vehicles which need highly accurate localization for integrated assistance systems or automated driving, but is not limited thereto and may also be used, for example, in mobile robots.

LIST OF REFERENCE NUMERALS

1-5 Method steps
F Vehicle
R Tires
LE Steering unit
S Environment sensor
K Camera
GS Yaw sensor
AS Evaluation and control unit
N Navigation unit AE Assistance unit
DB Databus The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining a position of a vehicle, comprising:
    determining highly accurate localization data for positions of the vehicle when traveling along a route, wherein the highly accurate localization data are determined using a digital area map and a sensory detection of landmarks marked on the digital area map;
    capturing odometric measured variables for an own odometry of the vehicle when traveling along the route;
    jointly evaluating the determined highly accurate localization data and the captured odometric measured variables;
    determining, if accurate localization data can be determined at the current position of the vehicle;
    selectively correcting the own odometry of the vehicle based on the evaluation based on the joint evaluation of the determined highly accurate localization data and the capture odometric measured variables, if accurate localization data can be determined; and
    selectively correcting the own odometry of the vehicle based on the last corrected own odometry in case the vehicle is travelling in an area in which highly accurate localization data cannot be determined.

2. The method of claim 1, wherein an error model for the own odometry of the vehicle is used to calculate a vehicle-specific drift and the own odometry of the vehicle is automatically corrected through compensation of the calculated drift.

3. The method of claim 2, wherein, in addition, influences on the vehicle from outside that vehicle are determined when traveling along the route and are taken into account in the error model in order to determine a vehicle-specific drift independent of the influences from outside the vehicle.

4. The method of claim 2, wherein, in addition, influences on the vehicle from outside that vehicle are determined when traveling along the route and are taken into account in the error model in order to determine a vehicle-specific drift independent of the influences from outside the vehicle.

5. The method of claim 1, wherein, in addition, influences on the vehicle from outside that vehicle are determined when traveling along the route and are taken into account in an error model in order to determine a vehicle-specific drift independent of the influences from outside the vehicle.

6. The method of claim 5, wherein the influences from outside the vehicle when traveling along the route comprise existing weather and/or road conditions.

7. The method of claim 1, wherein the odometric measured variables of the vehicle comprise, in particular, a wheel rotation, a yaw rate and/or a wheel steering angle.

8. The method of claim 1, wherein, in addition, a speed and/or a driving power of the vehicle is captured and taken into account in the error model.

9. A device for determining a position of a vehicle, comprising:
    a unit for capturing odometric measured variables for an own odometry of the vehicle when traveling along a route;
    an evaluation and control unit to:
        determine highly accurate localization data for positions of the vehicle when traveling along the route, wherein the highly accurate localization data are determined using a digital area map and a sensory detection of landmarks marked on the digital area map;
        jointly evaluate the highly accurate localization data determined and the odometric measured variables captured;
        determine, if accurate localization data can be determined at the current position of the vehicle;
        selectively correct the own odometry of the vehicle based on the evaluation based on the joint evaluation of the determined highly accurate localization data and the captured odometric measured variables if accurate localization data can be determined; and
        selectively correct the own odometry of the vehicle based on the last corrected own odometry in case the vehicle is travelling in an area in which highly accurate localization data cannot be determined.

10. The device of claim 9, wherein the device is arranged to carry out the method of claim 1.

* * * * *